United States Patent [19]
Sacripante et al.

[11] Patent Number: 5,411,829
[45] Date of Patent: May 2, 1995

[54] POLYIMIDE TONER COMPOSITIONS

[75] Inventors: Guerino G. Sacripante, Oakville; B. W. Anissa Yeung, Mississauga; T. Brian McAneney, Burlington, all of Canada; J. Stephen Kittelberger, Rochester, N.Y.

[73] Assignee: Xerox Corporation, Stamford, Conn.

[21] Appl. No.: 251,161

[22] Filed: May 31, 1994

[51] Int. Cl.$^6$ ............................................. G03G 9/087
[52] U.S. Cl. ...................................... 430/106; 430/109
[58] Field of Search ......................... 430/106, 109, 110

[56] References Cited

U.S. PATENT DOCUMENTS

| | | | |
|---|---|---|---|
| 4,513,074 | 4/1985 | Nash et al. | 430/106.6 |
| 4,543,313 | 9/1985 | Mahabadi et al. | 430/109 |
| 4,560,635 | 12/1985 | Hoffend et al. | 430/106.6 |
| 5,238,768 | 8/1993 | Ong | 430/110 |
| 5,348,830 | 9/1994 | Sacripanto et al. | 430/109 |
| 5,348,831 | 9/1994 | Sacripante et al. | 430/109 |

*Primary Examiner*—John Goodrow
*Attorney, Agent, or Firm*—E. D. Palazzo

[57] ABSTRACT

A toner composition comprised of pigment, and a polyimide of the formulas

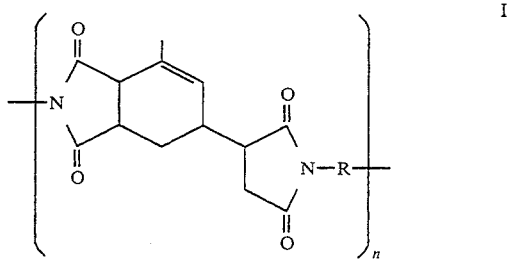

OR

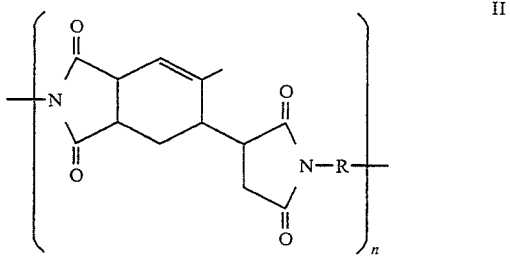

wherein n represents the number of monomer segments, and R is alkylene, oxyalkylene, or polyoxyalkylene.

25 Claims, No Drawings

POLYIMIDE TONER COMPOSITIONS

BACKGROUND OF THE INVENTION

This invention is generally directed to toner and developer compositions, and more specifically, the present invention is directed to developer and toner compositions containing novel polyimide resins, and process for the preparation thereof. In embodiments, there are provided in accordance with the present invention low cost and deinkable toner compositions comprised of certain economical polyimide resins obtained, for example, by melt condensation processes, and pigment particles comprised of, for example, carbon black, magnetites, or mixtures thereof, cyan, magenta, yellow, blue, green, red, or brown components, or mixtures thereof, thereby providing for the development and generation of black and/or colored images. In embodiments, there are provided in accordance with the present invention polyimide resins I, II, or mixtures thereof of the following formulas

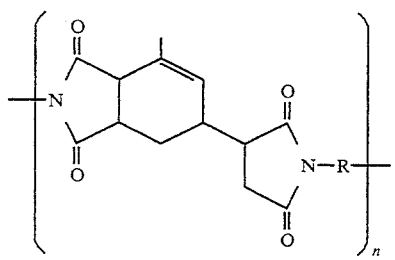

OR

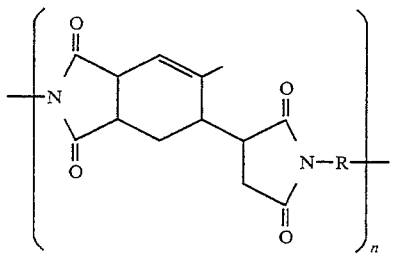

wherein n represents the number of repeating segments and can be a number of from about 10 to about 100,000 and preferably from about 10 to about 50,000; and R is an alkylene, oxyalkylene or polyoxyalkylene. The toner compositions of the present invention in embodiments possess a number of advantages including excellent deinkability, possess low fixing characteristics such as from about 120° C. to about 135° C., excellent blocking characteristics such as from about 45° C. to about 65° C., excellent nonvinyl-offset properties, and low relative humidity sensitivities. The polyimides of the present invention can in embodiments be generated by the reaction of a dianhydride such as 5-(2,5-dioxotetrahydrol)-3-methyl-3-cyclohexene-1,2-dicarboxylic anhydride (III) or 5-(2,5-dioxotetrahydrol)-4-methyl-3-cyclohexene-1,2-dicarboxylic anhydride (IV) available as B-4400 and B-5060, respectively, from Dai Nippon Ink Company,

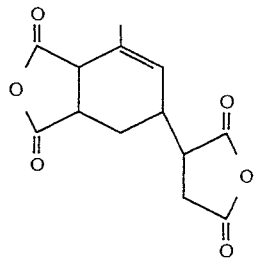

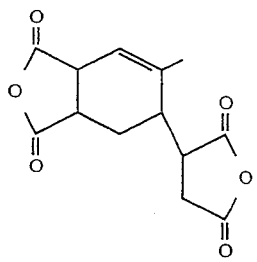

and a diamino terminated oxyalkyl or polyoxy alkyl, such as JEFFAMINES ™ available from Texaco Chemicals as JEFFAMINE D-230 ™, D-400 ™, D-700 ™, EDR-148 ™, EDR-192 ™ and believed to be of the following formula, or aliphatic diamines like DYTEK ™

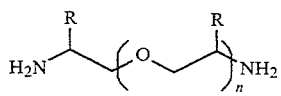

wherein
EDR-148 n=2;R=H
EDR-192 n=3;R=H
D-230 n=2, 3; R=$CH_3$
D-400 n=5, 6; R=$CH_3$.

The aforementioned polyimides exhibit in embodiments a number average molecular weight of from about 2,500 grams per mole to about 100,000 grams per mole as measured by vapor phase osmometer, have a glass transition temperature of from about 45° C. to about 65° C., and more preferably of from about 50° C. to about 65° C. as measured by the Differential Scanning Calorimeter, low fixing characteristics, such as from about 125° C. to about 145° C., and excellent deinkability.

In another embodiment, the polyimides of the present invention can be branched or crosslinked by utilizing an alkyltriamine or oxyalkyltriamine, such as JEFFAMINE T-403 ™ available from Texaco Company, and believed to be of the formula

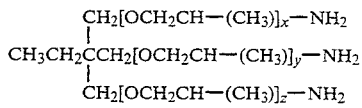

wherein the summation of x, y and z is about 5.3. The amount of branching monomer utilized is of from about 0.5 to about 6 percent by weight of polyimide.

A number of toner resins are known, such as styrene acrylates, styrene methacrylates, styrene butadiene, polyesters, polyamides, and the like.

Certain polyimide resins and, more specifically, liquid crystalline polyimide resins are known such as summarized and illustrated in the *Encyclopedia of Polymer Science and Engineering,* 2nd Edition, Volume No. 12, published by Wiley (1985). However, such polyimide resins are aromatic and useful as high performance materials, there being no disclosure for use as toners.

Thermotropic liquid crystalline polyimides are illustrated in copending application U.S. Pat. No. 5,348,830, the disclosure of which is totally incorporated herein by reference, which discloses toner and developer compositions with thermotropic liquid crystalline polyimides. The polyimide resins of this invention differ in that, for example, they do not exhibit liquid crystalline properties, and, moreover, are of substantially lower cost such as from about 80 percent to about 500 percent less than the liquid crystalline polyimides of U.S. Pat. No. 5,348,830 as estimated, for example, from the *Chemical Marketing Reporter* (1993 issue). Also, the imide structures of the resins of the present invention are comprised of a cyclic six membered ring containing a tertiary alkyl amine as contrasted to the aforementioned liquid crystalline polyimides of copending application U.S. Pat. No. 5,348,830, wherein the imide structure is comprised of a five membered cyclic ring without a tertiary alkyl amine moiety.

Illustrated in the following copending applications, the disclosures of each being totally incorporated herein by reference, are:

U.S. Ser. No. 144,075 illustrates a toner composition comprised of a pigment and a crosslinked polyimide; and wherein the crosslinked polyimide can be obtained from the reaction of a peroxide with an unsaturated polyimide of the formula

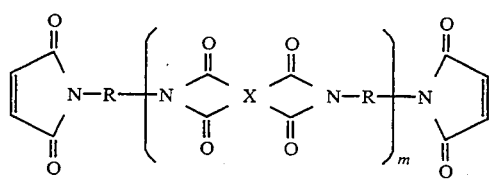

wherein X is

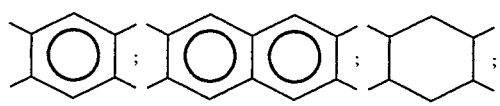

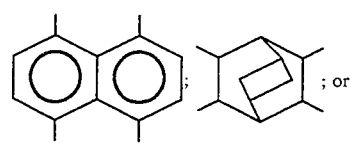; or

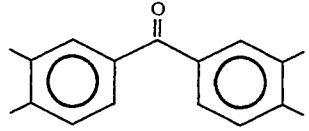

R is alkylene or oxyalkylene, and m represents the number of monomer segments present and is a number of from about 10 to about 1,000.

U.S. Pat. No. 5,348,831, illustrates a toner composition comprised of pigment, and a polyester imide resin of the formula

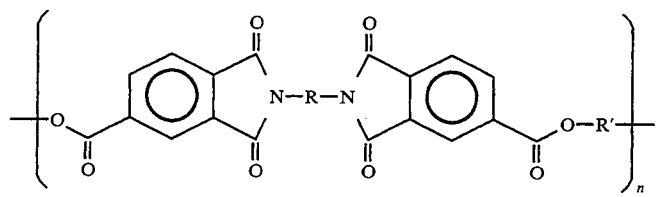

wherein n represent the number of segments present and is a number of from about 10 to about 10,000; R' is alkylene; and R is independently selected from the group consisting of an oxyalkylene and polyoxyalkylene.

U.S. Ser. No. 144,918, illustrates a toner composition comprised of pigment, and polyimide of the formula

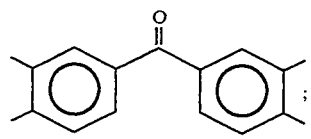

wherein m represents the number of monomer segments present; X is

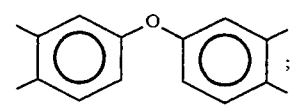

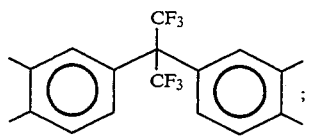

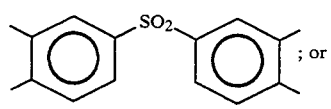; or

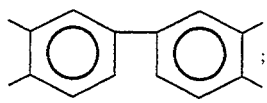

thus X can be benzophenone, oxydiphthalic, hexafluoropropane diphenyl, diphenyl sulfone, or biphenyl; and X is attached to four imide carbonyl moieties; and R is independently selected from the group consisting of alkyl, oxyalkylene and polyoxyalkylene.

U.S. Ser. No. 221,596 illustrates a toner comprised of pigment, and a polyimide-imine resin of the formula

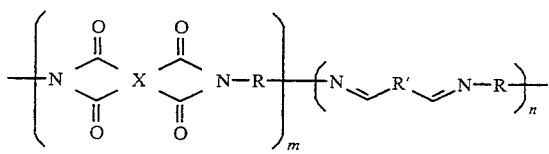

wherein m, and n represent the number of monomer segments; X is independently selected from the group consisting of a tetravalent aromatic, polyarylomatic or cycloaliphatic group with from about 6 to about 20 carbon atoms and a cycloaliphatic group; R is independently selected from the group consisting of alkylene, oxyalkylene and polyoxyalkylene; and R' is independently selected from the group consisting of alkylene and arylene. The toners of the copending application U.S. Ser. No. 221,596 can be consiudered deinkable in embodiments in caustic aqueous conditions of from about pH of 10 to about a pH of 14, and wherein the toner resin is believed to be decomposed to oligomers. One consequence of this is that the toner can be difficult to remove during the recycling of waste xerographic copies. This difficulty manifests itself in, for example, two ways. During the caustic repulping of the waste paper, the toner is not dissolved and adheres to the paper, which is reduced to pulp, and a significant fraction of the toner specks are found to remain attached to cellulose fibers at the conclusion of this step. Also, the ink specks are found to be large when compared with those resulting from other types of printed waste, such as newsprint or lithographic printing. The size of these ink specks from conventional xerographic copy, typically 100×100×10 microns in dimensions, render them too large to separate from pulp by the most common deinking separatory techniques. This differs from the present invention in embodiments with regard to deinkability in that, for example, the developers thereof are deinked from paper at milder caustic conditions, such as from about pH of 8 to about a pH of 10 with surfactants, and wherein the toner resin is believed to be dissolved.

Further, illustrated in copending patent applications U.S. Ser. No. 200,988 is a positively charged liquid developer comprised of thermoplastic resin particles, optional pigment, a charge director, and a charge adjuvant comprised of a polymer of an alkene and unsaturated acid derivative; and wherein the acid derivative contains, pendant ammonium groups, and wherein the charge adjuvant is associated with or combined with said resin and said optional pigment; and in U.S. Ser. No. 204,012 is a negatively charged liquid developer comprised of thermoplastic resin particles, optional pigment, a charge director, and an insoluble charge adjuvant comprised of a copolymer of an alkene and an unsaturated acid derivative, and wherein the acid derivative contains pendant fluoroalkyl or pendant fluoroaryl groups, and wherein the charge adjuvant is associated with or combined with said resin and said optional pigment, the disclosures of which are totally incorporated herein by reference.

SUMMARY OF THE INVENTION

Examples of objects of the present invention include.

It is an object of the present invention to provide toner and developer compositions with many of the advantages illustrated herein.

In another object of the present invention there are provided toner compositions with certain polyimides, and which toners are useful for the development of electrostatic latent images including color images..

In yet another object of the present invention there are provided processes for the preparation of certain polyimides by melt condensation methods.

Moreover, in another object of the present invention that are provided low melting toner compositions with rapid jetting rates, and wherein such toners avoid or minimize paper curl and enable high resolution developed images.

In another object of the present invention there are provided toners with low melt fusing temperatures of from about 130° C. to about 145° C., and a broad fusing latitude of from about 30° C. to about 60° C.

Moreover, in another object of the present invention there are provided toner compositions comprised of polyimides with glass transition temperature of from about 50° C. to about 65° C.

In yet another object of the present invention that are provided toner compositions comprised of polyimides with a weight average molecular weight of from about 1,500 grams per mole to about 100,000 grams per mole as measured by GPC.

Moreover, it is an object of the present invention to provide toners which display high gloss such as from about 30 to about 60 gloss units as measured by the Gardner Gloss metering unit, and excellent crease characteristics.

Moreover, it is an object of the present invention to provide a toner which displays low relative sensitivity such as from about 1.0 to about 2.3 as measured from the triboelectric charge ratio at the 20 percent humidity level and 80 percent humidity level.

Another object of the present invention resides in the formation of toners which will enable the development of images in electrophotographic imaging and printing apparatuses, which images have substantially no background deposits thereon, are substantially smudge proof or smudge resistant, and, therefore, are of excellent resolution; and further, such toner compositions can be selected for high speed electrophotographic apparatuses, that is those exceeding 70 copies per minute.

Also, in another object of the present invention there are provided polyimide resins with rapid jetting properties such as relative jetting rates of from about 1.0 to about 4.0, and preferably from about 1.2 to about 2.0.

These and other objects of the present invention can be accomplished in embodiments thereof by providing toner compositions comprised of polyimides of the formula illustrated herein, and pigment particles. In embodiments, the present invention is directed to a toner composition or a deinkable toner comprised of pigment, and polyimide of the formulas, or mixtures thereof

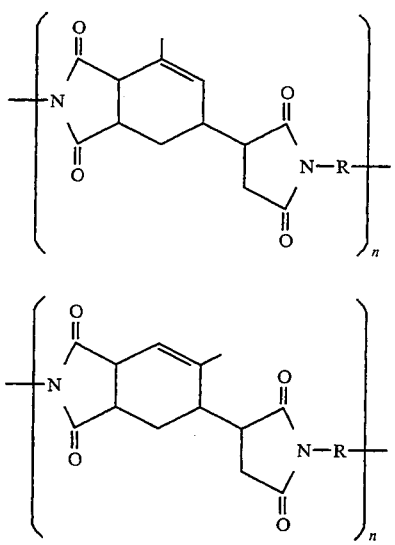

wherein n represents the number of monomer segments; and R is alkylene, oxyalkylene, or polyoxyalkylene.

The polyimide resins of the present invention can be prepared as illustrated herein, and more specifically, by charging a reactor equipped with a bottom drain valve, double turbine agitator and distillation receiver with a cold water condenser with from about 0.95 to about 1.05 mole of dianhydride, such as 5-(2,5-dioxotetrahydrol)-3-methyl-3-cyclohexene-1,2-dicarboxylic anhydride III or the 5-(2,5-dioxotetrahydrol)-4-methyl-3-cyclohexene-1,2-dicarboxylic anhydride IV available as B-4400 and B-5060, respectively, from Dai Nippon Ink Chemical Company, and 0.95 to about 1.05 mole of a flexible diamine, such as a diamino terminated polyoxypropylene available as JEFFAMINE 230 TM from Texaco Chemicals. The reactor is then heated from about 150° C. to about 170° C. with stirring for a duration of from about 3 hours whereby 0.5 to about 0.9 mole of water byproduct is collected in the distillation receiver. The mixture is then heated at from about 180° C. to about 190° C., after which the pressure is slowly reduced from atmospheric pressure to about 300 Torr over a period of from about one hour to about 5 hours with collection of approximately 0.1 to about 0.3 mole of water in the distillation receiver, and wherein the total amount of water collected from the beginning of the reaction is from about 0.95 to about 1.0 mole equivalent. The reactor is then purged with nitrogen to atmospheric pressure, and the resulting product, such as poly(oxypropylene-5-(2,5-dioxotetrahydrol)-4-methyl-3-cyclohexene-1,2-imide), is collected through the bottom drain valve. The glass transition temperature of the resin can then be measured and in embodiments is from about 45° C. to about 65° C. (onset) utilizing the 910 Differential Scanning Calorimeter available from E.I. DuPont operating at a heating rate of 10° C. per minute. The number average molecular weight can be measured and in embodiments is from about 1,500 grams per mole to about 20,000 grams per mole by vapor phase calorimetry.

Specific examples of the polyimide resins of the present invention include poly(5-(2,5-dioximide-tetrahydrol)-3-methyl-3-cyclohexene-1,2-dicarboxylimide-N-propyleneoxypropylene), poly(5-(2,5-dioximide-tetrahydrol)-3-methyl-3-cyclohexene-1,2-dicarboxylimide-N-ethylenoxyethylylene), poly(5-(2,5-dioximide-tetrahydrol)-3-methyl-3-cyclohexene-1,2-dicarboxylimide-N-diethylenoxydiethylene), poly(5-(2,5-dioximide-tetrahydrol)-3-methyl-3-cyclohexene-1,2-dicarboxylimide-N-ethylenoxyethyleneoxyethylene), poly(5-(2,5-dioximide-tetrahydrol)-3-methyl-3-cyclohexene-1,2-dicarboxylimide-N-propyleneoxypropyleneoxypropylene), poly(5-(2,5-dioximide-tetrahydrol)3-methyl-3-cyclohexene-1,2-dicarboxylimide-N-propyleneoxypropyleneoxypropyleneoxypropylene), mixtures thereof, and the like.

Specific examples of tetraacid or dianhydride monomers that can be utilized to prepare the polyimide, including 5-(2,5-dioxotetrahydrol)-3-methyl-3-cyclohexene-1,2-dicarboxylic anhydride III or the 5-(2,5-dioxotetrahydrol)-4-methyl-3-cyclohexene-1,2-dicarboxylic anhydride IV available as B-4400 and B-5060, respectively, from Dai Nippon Ink Chemical Company, and mixtures thereof. These monomers are selected in various effective amounts, such as from about 0.45 mole equivalent to about 0.55 mole equivalent.

Specific examples of diamino alkanes or diamino alkylene oxides that can be utilized to prepare the polyimides include diaminoethane, diaminopropane, 2,3-diaminopropane, diaminobutane, diaminopentane, diamino-2-methylpentane, also known as DYTEK A TM available from DuPont Chemical Company, diaminohexane, diamino-trimethylhexane, diaminoheptane, diaminooctane, diaminononane, diaminodecane, diaminododecane, diaminoterminated-ethylene oxide, diaminoterminated-diethylene oxide available as JEFFAMINE EDR-148 TM from Texaco Chemicals, diaminoterminated-diethylene oxide available as JEFFAMINE EDR-148 TM from Texaco Chemicals, diaminoterminated-triethylene oxide available as JEFFAMINE EDR-192 TM from Texaco Chemicals, diaminoterminated-polyoxypropylene oxide available from Texaco Chemicals as JEFFAMINE D-230 TM, JEFFAMINE 400 TM, JEFFAMINE 700 TM, mixtures thereof, and the like. This component is selected in various effective amounts such as from about 0.45 mole equivalent to about 0.55 mole equivalent of the polyimide resin.

Specific examples of branching agent that can be utilized to prepare the polyimides include JEFFAMINE T-403 TM available from Texaco Chemical Company. This component is selected in various effective amounts such as from about 0.005 mole equivalent to about 0.08 mole equivalent of the polyimide resin.

Various known colorants, especially pigments, present in the toner in an effective amount of, for example, from about 1 to about 25 percent by weight of toner, and preferably in an amount of from about 1 to about 10 weight percent that can be selected include carbon black like REGAL 330 ® magnetites, such as Mobay magnetites MO8029 TM, MO8060 TM; Columbian magnetites; MAPICO BLACKS TM and surface treated magnetites; Pfizer magnetites, CB4799 TM, CB5300 TM, CB5600 TM, MCX6369 TM; Bayer magnetites, BAYFERROX 8600 TM, 8610 TM; Northern Pigments magnetites, NP-604 TM, NP-608 TM; Magnox magnetites TMB-100 TM, or TMB-104 TM; and other equivalent black pigments. As colored pigments there can be selected known cyan, magenta, yellow, red, green, brown, blue or mixtures thereof. Specific examples of pigments include HELIOGEN BLUE L6900 TM, D6840 TM, D7080 TM, D7020 TM, PYLAM OIL BLUE TM and PYLAM OIL YELLOW TM, PIGMENT BLUE 1 TM available from Paul Uhlich & Company, Inc., PIGMENT VIOLET 1 TM, PIGMENT RED 48 TM, LEMON CHROME YELLOW DCC 1026 TM, E.D. TOLUIDINE RED TM and BON RED C TM available from Dominion Color Corporation, Ltd., Toronto, Ontario, NOVAperm YELLOW FGL TM, HOSTAPERM PINK E TM from Hoechst, and CINQUASIA MAGENTA TM available from E.I. DuPont de Nemours & Company, and the like. Generally, colored pigments that can be selected are cyan, magenta, or yellow pigments, and mixtures thereof. Examples of magenta materials that may be selected as pigments include, for example, 2,9-dimethyl-substituted quinacridone and anthraquinone dye identified in the Color Index as CI 60710, CI Dispersed Red 15, diazo dye identified in the Color Index as CI 26050, CI Solvent Red 19, and the like. Illustrative examples of cyan materials that may be used as pigments include copper tetra-(octadecyl sulfonamido) phthalocyanine, x-copper phthalocyanine pigment listed in the Color Index as CI 74160, CI Pigment Blue, and Anthrathrene Blue, identified in the Color Index as CI 69810, Special Blue X-2137, and the like; while illustrative examples of yellow pigments that may be selected are diarylide yellow 3,3-dichlorobenzidene acetoacetanilides, a monoazo pigment identified in the Color Index as CI 12700, CI Solvent Yellow 16, a nitrophenyl amine sulfonamide identified in the Color Index as Foron Yellow SE/GLN, CI Dispersed Yellow 33 2,5-dimethoxy-4-sulfonanilide phenylazo-4'-chloro-2,5-dimethoxy acetoacetanilide, and Permanent Yellow FGL. Colored magnetites, such as mixtures of MAPICO BLACK TM and cyan, may also be selected as pigments, and are employed in effective amounts of from, for example, about 1 weight percent to about 50 weight percent of the toner.

The toner may also include known charge additives such as alkyl pyridinium halides, bisulfates, the charge control additives of U.S. Pat. Nos. 3,944,493; 4,007,293; 4,079,014; 4,394,430 and 4,560,635, which illustrates a toner with a distearyl dimethyl ammonium methyl sulfate charge additive, the disclosures of which are totally incorporated herein by reference, negative charge additives like aluminum complexes, such as BONTRON E-88 TM, available from Orient Chemicals, and the like, and is present in the toner in amounts of, for example, from about 0.1 to about 5 weight percent.

Surface additives that can be added to the toner compositions of the present invention include, for example, metal salts, metal salts of fatty acids, colloidal silicas, tin oxides, titanium oxides, mixtures thereof and the like, which additives are usually present in an amount of from about 0.1 to about 1 weight percent, reference for example U.S. Pat. Nos. 3,590,000; 3,720,617; 3,655,374 and 3,983,045, the disclosures of which are totally incorporated herein by reference. Preferred additives include zinc stearate and AEROSIL R972 ® available from Degussa Chemicals. Also, waxes, such as polyproylene and polyethylene, can be added to the toner in amounts of, for example, from about 0.1 to about 3 weight percent.

In another embodiment of the present invention there are provided, subsequent to known micronization and classification, toner with an average volume diameter of from about 5 to about 20 microns comprised of polyimide resin, and pigment particles, and optional charge enhancing additives.

The polyimide resin is present in a sufficient, but effective amount, for example from about 70 to about 95 weight percent. Thus, when 1 percent by weight of a charge enhancing additive is present, and 10 percent by weight of pigment or colorant, such as carbon black, is contained therein, about 89 percent by weight of resin is selected. Also, the charge enhancing additive may be coated on the pigment particles.

The toner and developer compositions of the present invention may be selected for use in electrostatographic imaging apparatuses containing therein known photoreceptors. Thus, the toner and developer compositions of the present invention can be used with layered photoreceptors, such as those described in U.S. Pat. No. 4,265,990, the disclosure of which is totally incorporated herein by reference. Illustrative examples of inorganic photoreceptors that may be selected for imaging and printing processes include selenium; selenium alloys, such as selenium arsenic, selenium tellurium and the like; halogen doped selenium substances; and halogen doped selenium alloys.

Developer compositions include carrier particles, and the polyimide toners illustrated herein, examples of carriers being steel, iron, ferrites, silicon oxides, and the like, reference for example U.S. Pat. Nos. 4,937,166 and 4,935,326, the disclosures of which are totally incorporated herein by reference.

The following Examples are being provided to further define various species of the present invention, and these Examples are intended to illustrate and not limit the scope of the present invention. Parts and percentages are by weight unless otherwise indicated.

EXAMPLE I

A polyimide resin derived from 5-(2,5-dioxotetrahydrol)-3-methyl-3-cyclohexene-1,2-dicarboxylic anhydride and diamino terminated polyoxypropylene with an average molecular weight of 230 and available as JEFFAMINE D-230 TM from Texaco Chemical Company was prepared as follows:

A mixture of 5-(2,5-dioxotetrahydrol)-3-methyl-3-cyclohexene-1,2-dicarboxylic anhydride (113 grams) and JEFFAMINE D-230 TM (81 grams) were charged into a 300 milliliter Parr reactor equipped with a mechanical stirrer, distillation receiver and bottom valve drain. The resulting mixture was heated to 150° C. and stirred for 30 minutes, followed by increasing the temperature to 175° C. whereby water started to distill. The mixture was then maintained at 175° C. for 2 hours whereby 10 grams of water (90 percent) was collected. The reactor temperature was then increased to 200° C. with slow purging of nitrogen for 30 minutes. The bottom drain of the reactor was then opened, and the polyimide resin, poly(5-(2,5-dioximide-tetrahydrol)-3-methyl-3-cyclohexene-1,2-dicarboxylimide-N-propyleneoxypropylene), was allowed to pour into a container cooled with dry ice, and measured to be grams. The number average molecular weight of the resin resulting was then measured to be grams per mole as measured by vapor pressure osmometry using toluene as the solvent. The glass transition temperature of the resin product was measured to about 70° C., using the DuPont Differential Scanning Calorimeter at 10° C. per minute. 1.8 Grams of the aforementioned polyimide resin were then pressed into a pellet and subjected to the Shimadzu 500 Flowtester operated from room temperature to 130° C. at 10° C. per minute and utilizing a load of 20 killigrams with a die diameter and length of 1 millimeter by 2 millimeters. The softening temperature was found to be 105° C., the beginning of flow temperature (T$_1$) was found to be 124° C., and flow temperature (T$_2$) was found to be 130° C.

EXAMPLE II to EXAMPLE VIII

A series of polyimide resins derived from 5-(2,5-dioxotetrahydrol)-3-methyl-3-cyclohexene-1,2-dicarboxylic anhydride and a mixture of diamino terminated polyoxypropylene with an average molecular weight of 230 grams per mole, and with an average molecular weight of 400 grams per mole and available from Texaco Chemical Company as JEFFAMINE D-230 ™ and JEFFAMINE D-400 ™, respectively, was prepared by essentially repeating the process of Example I. The molecular weights, glass transition temperatures and thermal properties of the corresponding resins are listed in Table 1.

TABLE 1

Polyimide Resins Derived From 5-(2,5-dioxotetrahydrol)-3-methyl-3-cyclohexene-1,2-dicarboxylic Anhydride and JEFFAMINES ™

| EXAMPLE | JEFFAMINE ™ (Ratio) | | Tg (°C.) Resin | GPC Kg/mole | | Shimadzu (°C.) | |
|---|---|---|---|---|---|---|---|
| | D-230 | D-400 | | M$_n$ | M$_w$ | T$_{f1}$ | T$_{f2}$ |
| II | 100 | 0 | 72.8 | 8.5 | 28.8 | 105 | 121 |
| III | 90 | 10 | 60.7 | 7.1 | 19.6 | 93 | 110 |
| IV | 85 | 15 | 57.3 | 7.2 | 21.2 | 91 | 108 |
| V | 81 | 19 | 53.1 | 7.5 | 22.5 | 92 | 109 |
| VI | 81 | 19 | 54.1 | 8.2 | 25.6 | 93 | 108 |
| VII | 81 | 19 | 56.1 | 10.2 | 37 | 93 | 110 |
| VIII | 81 | 19 | 55 | 10.0 | 39.9 | 91 | 110 |

EXAMPLE IX to EXAMPLE XIII

A series of polyimide resin derived from 5-(2,5-dioxotetrahydrol)-3-methyl-3-cyclohexene-1,2-dicarboxylic anhydride, a mixture of diamino terminated polyoxypropylene with an average molecular weight of 230 grams per mole, and with an average molecular weight of 400 grams per mole and available from Texaco Chemical Company as JEFFAMINE D-230 ™ and JEFFAMINE D-400 ™, respectively, and the branching agent JEFFAMINE T-403 ™, also available from Texaco Chemical Company, was prepared by the process as described in Example I. The molecular weights, glass transition temperatures and thermal properties of the corresponding resins are listed in Table 2.

TABLE 2

Branched Polyimide Resins Derived From 5-(2,5-Dioxotetrahydrol)-3-methyl-3-cyclohexene-1,2-dicarboxylic Anhydride, JEFFAMINE D-234 ™, D-400 ™ and T-402 ™

| EXAMPLE | JEFFAMINES ™ | | | Tg (°C.) Resin | GPC Kg/mole | | Shimadzu (°C.) | |
|---|---|---|---|---|---|---|---|---|
| | D-230 | D-400 | T-403 | | M$_n$ | M$_w$ | T$_{f1}$ | T$_{f2}$ |
| IX | 81 | 19 | 1 | 56.2 | 9.4 | 41 | 96 | 113 |
| X | 81 | 19 | 2 | 56 | 10.2 | 52.3 | 99 | 117 |
| XI | 81 | 19 | 4 | 56.1 | 9 | 53 | 97 | 114 |
| XII | 81 | 19 | 6 | 56.5 | 8.5 | 63.4 | 103 | 127 |
| XIII | 84 | 16 | 4 | 60.3 | 10.1 | 102.9 | 101 | 126 |

EXAMPLE XIV

A black toner composition comprised of 94 percent by weight of the polyimide resin of Example II and 6 percent by weight of REGAL 330 ® carbon black pigment was prepared as follows.

The polyimide resin of Example I was in the form of a large chunk. The resulting polymer was ground to about 500 microns average volume diameter in a Model J Fitzmill equipped with an 850 micrometer screen. After grinding, 108 grams (98 percent by weight of toner) of polymer were mixed with 12 grams of REGAL 330 ® pigment (6 percent by weight of toner). The two components were dry blended on a roll mill. A melt mixer from Haake was then used to melt mix the aforementioned mixture at a barrel temperature of 120° C. for a duration of 15 minutes. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 7.5 microns with a geometric distribution of 1.55 as measured by the Coulter Counter. The resulting toner was then utilized without further classification. A developer composition was prepared by roll milling the aforementioned toner, 3 parts by weight, with 100 parts by weight of 80 micron diameter carrier comprised of a steel core with polyvinylidenefluoride (KYNAR ®) polymer coating thereof, 0.75 weight percent. Unfused copies were then produced using a Xerox Corporation 1075 imaging apparatus with the fusing system disabled. The unfused copies were then subsequently fused with the 1075 fuser. Fusing evaluation of the toner indicated a minimum fixing temperature of about 132° C., and hot-offset temperature of 155° C.

EXAMPLE XV

A black toner composition comprised of 94 percent by weight of the polyimide resin of Example III and 6 percent by weight of REGAL 330 ® pigment (a carbon black commercially available) was prepared as follows.

The polyimide resin of Example I was in the form of a large chunk. The resulting polymer was ground to about 500 microns average volume diameter in a Model J Fitzmill equipped with an 850 micrometer screen. After grinding, 108 grams (98 percent by weight of toner) of polymer were mixed with 12 grams of REGAL 330 ® pigment (6 percent by weight of toner). The two components were dry blended on a roll mill. A melt mixer from Haake was then used to melt mix the aforementioned mixture at a barrel temperature of 120° C. for a duration of 15 minutes. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 7.8 microns with a geometric distribution of 1.53 as measured by the Coulter Counter. The resulting toner was then utilized without further classification. A developer composition was prepared by roll milling the aforementioned toner, 3 parts by weight with 100 parts by weight of 80 micron diameter carrier comprised of a steel core with polyvinylidenefluoride (KYNAR®) polymer coating thereof, 1.25 weight percent. Unfused copies were then produced with a Xerox Corporation 1075 imaging aparatus with the fusing system disabled. The unfused copies were then subsequently fused the 1075 fuser. Fusing evaluation of the toner indicated a minimum fixing temperature of about 131° C., and hot-offset temperature of 150° C.

EXAMPLE XVI

A black toner composition comprised of 94 percent by weight of the polyimide resin of Example IV and 6 percent by weight of REGAL 330® carbon black pigment was prepared as follows.

The polyimide resin of Example I was in the form of a large chunk. The resulting polymer was ground to about 500 micons average volume diameter in a Model J Fitzmill equipped with an 850 micrometer screen. After grinding, 108 grams (98 percent by weight of toner) of polymer was mixed with 12 grams of REGAL 330® pigment (6 percent by weight of toner). The two components were dry blended on a roll mill. A melt mixer from Haake was then used to melt mix the aforementioned mixture at a barrel temperature of 120° C. for a duration of 15 minutes. The extruded strands were broken into coarse particles utilizing a coffee bean grinder available from Black and Decker. An 8 inch Strutevant micronizer was used to reduce the particle size further. After grinding, the toner was measured to display an average volume diameter particle size of 9.1 microns with a geometric distribution of 1.41 as measured by the Coulter Counter. The resulting toner was then utilized without further classification. A developer composition was prepared by roll milling the aforementioned toner, 3 parts by weight with 100 parts by weight of 80 micron diameter carrier comprised of a steel core with polyvinylidenefluoride (KYNAR®) polymer coating thereof, 0.75 weight percent. Unfused copies were then produced using a Xerox Corporation 1075 imaging apparatus with the fusing system disabled. The unfused copies were then subsequently fused with the 1075 fuser. Fusing evaluation of the toner indicated a minimum fixing temperature of about 128° C., and hot-offset temperature of 150° C.

EXAMPLE XVII

A black toner composition comprised of 94 percent by weight of the polyimide resin of Example VI and 6 percent by weight of REGAL 330® carbon black pigment was prepared as follows.

The polyimide resin of Example I was in the form of a large chunk. The resulting polymer was ground to about 500 microns average volume diameter in a Model J Fitzmill equipped with an 850 micrometer screen. After grinding, 108 grams (98 percent by weight of toner) of polymer were mixed with 12 grams of REGAL 330® pigment (6 percent by weight of toner). The two components were dry blended on a roll mill. A melt mixer from Haake was then used to melt mix the aforementioned mixture at a barrel temperature of 120° C. for a duration of 15 minutes. The extruded strands were broken into coarse particles utilizing a coffee bean grinder available from Black and Decker. An 8 inch Sturtevant micronizer was used to reduce the particle size further. After grinding, the toner was measured to display an average volume diameter particle size of 8.9 microns with a geometric distribution of 1.4 as measured by the Coulter Counter. The resulting toner was then utilized without further classification. A developer composition was prepared by roll milling the aforementioned toner, 3 parts by weight with 100 parts by weight of 80 micron diameter carrier comprised of a steel core with polyvinylidenefluoride (KYNAR®) polymer coating thereof, 1.25 weight percent. Unfused copies were then produced using a Xerox Corporation 1075 imaging apparatus with the fusing system disabled. The unfused copies were then subsequently fused with the 1075 fuser. Fusing evaluation of the toner indicated a minimum fixing temperature of about 130° C., and hot-offset temperature of 155° C.

EXAMPLE XVIII

A black toner composition comprised of 94 percent by weight of the polyimide resin of Example X and 6 percent by weight of REGAL 330® carbon black pigment was prepared as follows.

The polyimide resin of Example I was in the form of a large chunk. The resulting polymer was ground to about 500 microns average volume diameter in a Model J Fitzmill equipped with an 850 micrometer screen. After grinding, 108 grams (98 percent by weight of toner) of polymer were mixed with 12 grams of REGAL 330® pigment (6 percent by weight of toner). The two components were dry blended on a roll mill. A melt mixer from Haake was then used to melt mix the aforementioned mixture at a barrel temperature of 120° C. for a duration of 15 minutes. The extruded strands were broken into coarse particles utilizing a coffee bean grinder available from Black and Decker. An 8 inch Sturtevant micronizer was used to reduce the particle size further. After grinding, the toner was measured to display .an average volume diameter particle size of 8.4 microns with a geometric distribution of 1.38 as measured by the Coulter Counter. The resulting toner was then utilized without further classification. A developer composition was prepared by roll milling the aforementioned toner, 3 parts by weight with 100 parts by weight of 80 micron diameter carrier comprised of a steel core with polyvinylidenefluoride (KYNAR®) polymer coating thereof, 1.25 weight percent. Unfused copies were then produced using a Xerox Corporation 1075 imaging apparatus with the fusing system disabled. The unfused copies were then subsequently fused with the 1075 fuser. Fusing evaluation of the toner indicated a minimum fixing temperature of about 126° C., and hot-offset temperature of 160° C.

EXAMPLE XIX

Deinking of the fused images resulting from Example XVI using t-octylphenoxypolyethoxyethanol surfactant was accomplished as follows.

The fused image of Example XVI comprised of a solid square area of 6 inches in diameter and with a toner mass per area of 1.1 milligram per square centimeter was immersed in a 4 liter beaker containing 2 liters of an aqueous solution of t-octylphenoxypolyethoxyethanol surfactant (20 grams) available as Triton X-100 from Sigma Chemicals. The immersed image was left undisturbed at ambient temperature, about 25° C., for 3 hours, during which the image was completely removed from the paper. The aqueous mixture was then neutralized with dilute one normal hydrochloric acid, and the organic portion was extracted with 100 grams of methylene chloride. The organic extract was then concentrated to a resin utilizing a rotary evaporater, and found to display a glass transition temperature of 57° C. confirming that the toner resin was dissolved from the paper and not decomposed.

EXAMPLE XX

Deinking of the fused images resulting from Example XVIII, by the conventional repulping process as utilized by the paper recycling industry was accomplished as follows.

Three-hundred grams dry weight (about 70 imaged copies of Example XVIII) were added to a laboratory repulper along with sufficient 45° C. deionized water to achieve a pulp consistency to 3 percent. The pH was adjusted to 10.0 with sodium hydroxide, and 0.2 percent (based on the dry weight of copies) of Hipochem DI-2000 deinking surfactant was added. This slurry was agitated in the repulper at 45° C. for 60 minutes total repulping time. At the conclusion of repulping, samples of the pulp were drawn for preparation of standard TAPPI handsheets; 1.2 gram samples were used to prepare handsheets for brightness measurements, and 0.6 gram samples were used for handsheets for image analysis.

Ink specks and other contaminants are most commonly removed from recycled pulp by the flotation technique. For flotation studies, an 867 gram sample of the repulped slurry was further diluted with deionized water to 1 percent consistency, or a total volume of about 2.6 liters. This sample was adjusted to 45° C., and added to a Denver Laboratory Flotation Cell. Flotation to remove the toner image specks was conducted at 1,200 RPM rotor speed for a total of three minutes with the ink-laden foam being removed manually throughout the run. To determine the efficiency of toner removal, samples of the purified pulp slurry were again converted to handsheets using the procedures described above.

The toner size of from 50 to 700 microns diameter, and frequency of toner specks in the handsheets were determined by image analysis over a total area of 0.5 cm$^2$ for repulped samples, and over 6 cm$^2$ for the flotation-purified samples. The brightness of the samples after repulping and after flotation was determined using the standard TAPPI brightness procedure.

The results of the image analysis showed that images generated from Example XVIII disintegrated on repulping into very small particles, the most abundant of which were 50 to 75 microns in diameter, the lower limit of the image analyzer's resolution. By comparison, toner from images obtained on a Xerox Corporation 1065 imaging apparatus or copier with Xerox Corporation 1065 toner as a control was found to disintegrate into much larger particles, the most abundant of which were 125 microns in diameter.

The larger particles from the 1065 toner were more difficult to remove by flotation. As measured by image analysis, only 93% of the 1065 toner specks as measured by area coverage was removed by floating, while 98 percent of the toner of Example XVIII was removed by flotation.

The handsheets analyzed for brightness, which measures toner specks smaller than 50 microns in diameter, showed a similar result. Flotation produced a relative brightness gain of only 6 percent in pulp from 1065 images, while a 29 percent brightness gain resulted from flotation of the Example XVIII toner pulp.

Images generated from the toner of Example XVIII, therefore, disintegrate on repulping into much smaller ink specks as compared to those from the toner control 1065 images, and these smaller specks are much easier to remove from the pulp by standard flotation techniques.

Other embodiments and modifications of the present invention may occur to those skilled in the art subsequent to a review of the information presented herein; these embodiments and modifications, as well as equivalents thereof, are also included within the scope of this invention.

What is claimed is:

1. A toner composition comprised of pigment, and a polyimide of the formulas

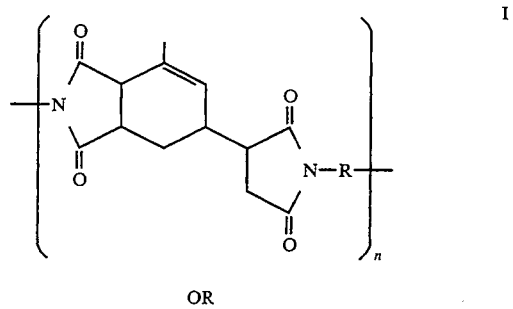

OR

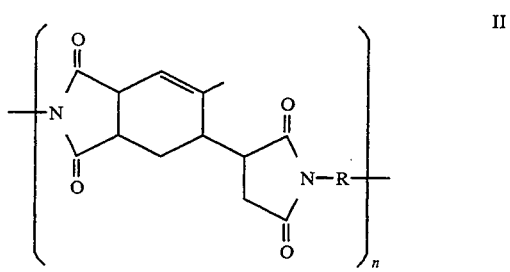

wherein n represents the number of monomer segments, and R is alkylene, oxyalkylene, or polyoxyalkylene.

2. A toner in accordance with claim 1 wherein R is alkylene with from 1 to about 25 carbon atoms.

3. A toner in accordance with claim 1 wherein R is methylene, ethylene, propylene, butylene, pentylene, hexylene, heptylene, octylene, nonyl, decylene, undecylene, dodecylene, stearylene, laurylene, or mixtures thereof.

4. A toner in accordance with claim 1 wherein R is an oxyalkylene selected from the group consisting of diethyleneoxide, dipropyleneoxide, triethyleneoxide, polypropyleneoxide, and mixtures thereof.

5. A toner in accordance with claim 1 wherein the polyimide is selected from the group consisting of poly(5-(2,5-dioximide-tetrahydrol)-3-methyl-3-cyclohexene-1,2-dicarboxylimide-N-propyleneoxypropylene), poly(5-(2,5-dioximide-tetrahydrol)-3-methyl-3-cyclohexene-1,2-dicarboxylimide-N-ethylenoxyethylene), poly(5-(2,5-dioximide-tetrahydrol)-3-methyl-3-cyclohexene-1,2-dicarboxylimide-N-diethylenoxydiethylene), poly(5-(2,5-dioximide-tetrahydrol)-3-methyl-3-cyclohexene-1,2-dicarboxylimide-N-ethylenoxyethyleneoxyethylene ), poly(5-(2,5-dioximide-tetrahydrol)-3-methyl-3-cyclohexene-1,2-dicarboxylimide-N-propyleneoxypropyleneoxypropylene), poly(5-(2,5-dioximide-tetrahydrol)-3-methyl-3-cyclohexene-1,2-dicarboxylimide-N-propyleneoxypropyleneoxypropyleneoxypropylene), and mixtures thereof; and is optionally selected in an amount of from about 65 percent by weight to about 98 percent by weight of toner.

6. A toner in accordance with claim 1 wherein the polyimide has an $M_n$ of from about 1,500 to about 20,000, and an $M_w$ of from about 2,500 to about 100,000.

7. A toner in accordance with claim 1 which possesses a low fixing temperature of from about 120° C. to about 145° C. and a broad fusing latitude of from about 40° C. to about 120° C.

8. A toner in accordance with claim 1 wherein the polyimide is obtained from the reaction of from about 0.40 mole equivalent to about 0.55 mole equivalent of an acid dianhydride, and from about 0.40 mole equivalent to about 0.55 mole equivalent of a diamine.

9. A toner in accordance with claim 8 wherein the acid dianhydride is selected from the group consisting of 5-(2,5-dioxotetrahydrol)-3-methyl-3-cyclohexene-1,2-dicarboxylic anhydride or 5-(2,5-dioxotetrahydrol)-4-methyl-3-cyclohexene-1,2-dicarboxylic anhydride), and mixtures thereof.

10. A toner in accordance with claim 8 wherein the diamine is selected from the group consisting of diaminoethane, diaminopropane, 2,3-diaminopropane, diaminobutane, diaminopentane, diamino-2-methylpentane diaminohexane, diamino-trimethylhexane, diaminoheptane, diaminooctane, diaminononane, diaminodecane, diaminododecane, diaminoterminated diethyleneoxide, diaminoterminated triethyleneoxide, and a polyoxyalkylene of the formula

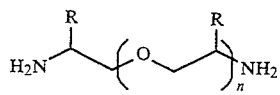

wherein R represents a hydrogen or alkyl group, and n represents the number of monomer segments and is a number of from about 1 to about 10.

11. A toner composition in accordance with claim 1 with a glass transition temperature thereof of from about 50° C. to about 65° C.

12. A toner composition in accordance with claim 1 with a relative humidity sensitivity of from about 1.01 to about 2.3.

13. A toner composition in accordance with claim 1 further including a charge enhancing additive incorporated into the toner, or present on the surface of the toner.

14. A toner composition in accordance with claim 1 further containing a wax component with a weight average molecular weight of from about 1,000 to about 10,000.

15. A toner composition in accordance with claim 1 further containing as external additives metal salts of a fatty acid, colloidal silicas, or mixtures thereof.

16. A toner composition in accordance with claim 1 wherein the pigment is carbon black, magnetites, or mixtures thereof, cyan, magenta, yellow, red, blue, green, brown, or mixtures thereof.

17. A developer composition comprised of the toner composition of claim 1 and carrier particles.

18. A developer composition in accordance with claim 17 wherein the carrier particles are Comprised of ferrites, steel, or an iron powder with an optional coating, or mixture of coatings.

19. A method of imaging which comprises formulating an electrostatic latent image on a photoconductive imaging member, affecting development thereof with the toner composition of claim 1, and thereafter, transferring the developed image to a suitable substrate.

20. A process for the preparation of the polyimides of claim 1 which comprises heating and admixing two monomers, one of which is a dianhydride and the other is a diamine, to a temperature of from about 150° C. to about 190° C., followed by continued heating at from about 190° C. to about 250° C., and thereafter isolating the product.

21. A process in accordance with claim 20 wherein heating from about 150° C. to about 190° C. is accomplished for a duration of from about 60 minutes to about 900 minutes, and continued heating is accomplished for a duration of from about 1 minute to about 300 minutes.

22. A toner in accordance with claim 1 wherein n is a number of from about 10 to about 100,000, and mixtures of said polyimides are selected.

23. A toner in accordance with claim 8 further including as a reactant a branching agent of the formula

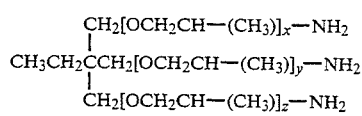

selected in amounts of from about 0.005 to about 0.08 mole percent by weight of polyimide, and wherein x, y and z are equal to about 5.3.

24. A deinkable toner composition comprised of pigment, and polyimide of the formulas

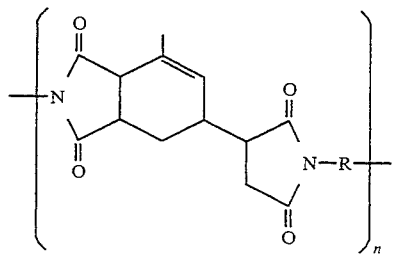

OR

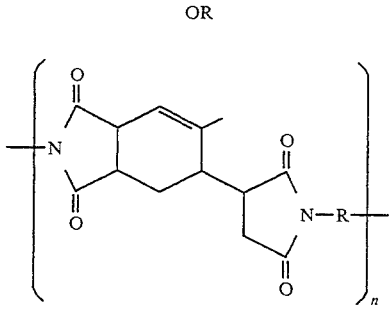

wherein n represents the number of monomer segments, and R is alkylene, oxyalkylene, or polyoxyalkylene.

25. A toner in accordance with claim 24 wherein n is a number of from about 10 to about 100,000, and wherein the toner is deinkable by liberation from paper fibers and disintegrates into small ink particles.

* * * * *